Dec. 18, 1962  H. H. HENSON  3,069,190
DETACHABLE IMPLEMENT HANDLE
Filed Nov. 15, 1960
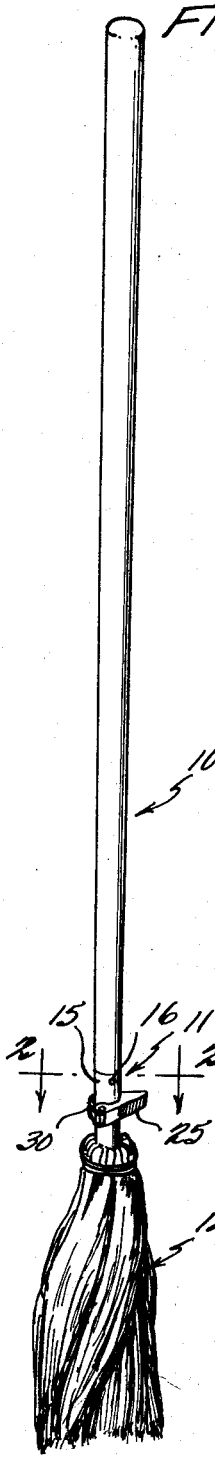
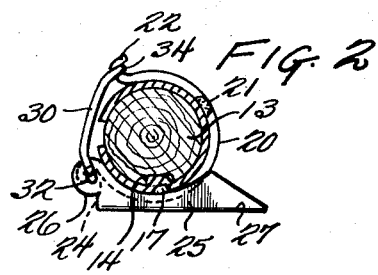
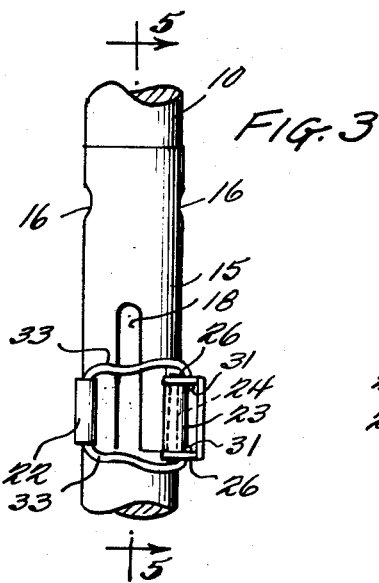
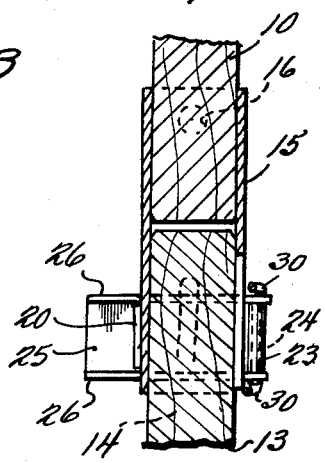
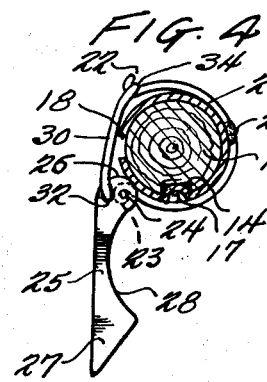
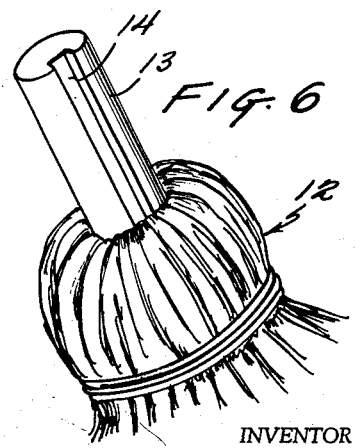
INVENTOR
HARRY H. HENSON
BY
Kimmel & Crowell
ATTORNEYS 3,069,190
DETACHABLE IMPLEMENT HANDLE
Harry H. Henson, Box 505, Urania, La.
Filed Nov. 15, 1960, Ser. No. 69,395
1 Claim. (Cl. 287—118)

This invention relates to a detachable implement handle, and more particularly to a handle which may be provided with a plurality of implements, such as brooms, mops, brushes or the like.

A particular object of this invention is the provision of a handle having a permanent attachment means associated therewith, whereby an implement having a stub shaft may be interchangeably secured thereto, or alternatively, may be replaced with a new implement when the old one becomes worn or otherwise unusable.

An additional object of the invention resides in the provision of an improved fastening means for securing the handle to the implement with which it is associated.

Still another object resides in the provision of an attachment of this sort which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawings:

FIGURE 1 is a perspective view of one form of implement handle showing a mop associated therewith.

FIGURE 2 is an enlarged sectional view taken substantially along the line 2—2 of FIG. 1 as viewed in the direction indicated by the arrows.

FIGURE 3 is an enlarged plan view of the fastening means between the handle and the stub shaft of the implement.

FIGURE 4 is a sectional view taken substantially along the lines 4—4 of FIGURE 3, or a view similar to FIG. 2 showing the parts in a different position of adjustment.

FIGURE 5 is a sectional view taken substantially along the line 5—5 of FIG. 3 as viewed in the direction indicated by the arrows; and FIGURE 6 is a fragmentary perspective view showing a mop and the stub shaft associated therewith.

Similar reference characters refer to similar parts throughout the several views of the drawings.

Having reference now to the drawings in detail, there is generally indicated at 10 an implement handle, which preferably comprises a straight elongated shank, although other forms may be employed if desired.

A fastening implement is generally indicated at 11, and is secured to the end of the handle in a manner to be more fully described hereinafter. There is generally indicated at 12 a mop, although a broom, brush, or other implement may be substituted for the mop, if desired, which is provided with a stub shaft 13, which has a longitudinally extending groove or channel 14 therein. The fastening element of the instant invention comprises a sleeve 15 having a pair of oppositely disposed indentations 16 therein, which engage in suitable detents in the periphery of handle 10 for the purpose of securely affixing the sleeve thereto in semi-permanent relation. Sleeve 15 is provided with an internally positioned rib 17, which is adapted when the stub shaft 13 is inserted into the open end thereof to align with and engage the groove 14 for the purpose of preventing rotation of the parts.

The lower portion of sleeve 15 is provided with a longitudinally extending split portion 18, as best shown in FIGS. 2, 3, and 4 to permit compression thereof when it is desired to hold the parts in related assembly.

A clamping band 20 is secured to the lower portion of sleeve 15 in any desired manner as by welding 21, and includes a free end having a hook portion 22 thereon and a relatively fixed end which is reverted as at 23 to encircle a pivot pin 24 which is provided between the legs of a generally U-shaped clamping member 25, the legs being indicated at 26, and best shown in FIG. 3. Clamping member 25 may be made of sheet metal, or the like, and includes an extending handle portion 27, and an arcuate inner periphery which is adapted to engage about the fixed portion of band 20.

A wire fastening element 30 is provided with reverted end portions 31 which engage in suitable openings 32 in the leg portions 26 of fastening element 25, and includes legs 33 and a bight portion 34 which is engageable with the hook shaped end 22. The arrangement is obviously such that with the parts in the position shown in FIG. 4, the stub handle 13 may be readily removed from the sleeve 15, for suitable replacement by the stub shaft to another implement, but with the parts as shown in FIG. 2 the offset arrangement of the ends 31 of the wire clamping member 30 tightens clamping band 20 to compress sleeve 15 about the split portion 18 in such manner as tightly to clamp the stub shaft 13 and hold the same in related assembly with the handle member 10.

From the foregoing it will now be seen that there is herein provided an improved detachable implement handle and clamping means therefor which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

A detachable implement handle comprising a shank having a pair of diametrically opposed detents adjacent an end thereof, a metallic sleeve having diametrically opposed indentations in one end positioned over said shank with said indentations engageable in said detents, the other end of said sleeve having a single longitudinal slot therein open at one end, a circumferential resilient clamping band welded at one peripheral point to said sleeve, said clamping band having a hook shaped free end and a reverted end forming a sleeve, a clamping element of U-shaped cross-sectional configuration, a pivot pin for said clamping element extending between the legs of the U, said reverted end receiving said pivot pin, said clamping element having an elongated handle portion mounted on and extending from said pivot, a generally U-shaped clamping wire having reverted ends engaged in openings in the legs of the U-shaped element adjacent said pivot pin but between said pivot pin and the bight of said U-shaped element, and opposite said elongated handle, the bight of said U-shaped wire engaging said hook shaped end of said clamping band to draw said band tight and compress said sleeve along said longitudinal slot when said elongated handle is swung toward said shaft, said clamping band having an interiorly positioned rib thereon adapted for engagement in a corresponding groove in a stub shaft insertable in said other end of said sleeve.

References Cited in the file of this patent
UNITED STATES PATENTS

| | | |
|---|---|---|
| 724,475 | Hilmo | Apr. 7, 1908 |
| 1,807,559 | Smith | May 26, 1931 |
| 1,847,475 | Donald | Mar. 1, 1932 |
| 2,018,906 | Winter | Oct. 29, 1935 |

FOREIGN PATENTS

| | | |
|---|---|---|
| 195,302 | Great Britain | Mar. 29, 1923 |